Dec. 18, 1951     W. P. BOLLINGER ET AL     2,579,249
PRESSURIZED RADIO SYSTEM

Filed April 30, 1946     2 SHEETS—SHEET 1

INVENTORS.
Waldon P. Bollinger
Fredrick A. Fuhrmeister
& Justin E. Hill Jr.
BY
ATTORNEY Dec. 18, 1951         W. P. BOLLINGER ET AL         2,579,249
                      PRESSURIZED RADIO SYSTEM
Filed April 30, 1946                              2 SHEETS—SHEET 2
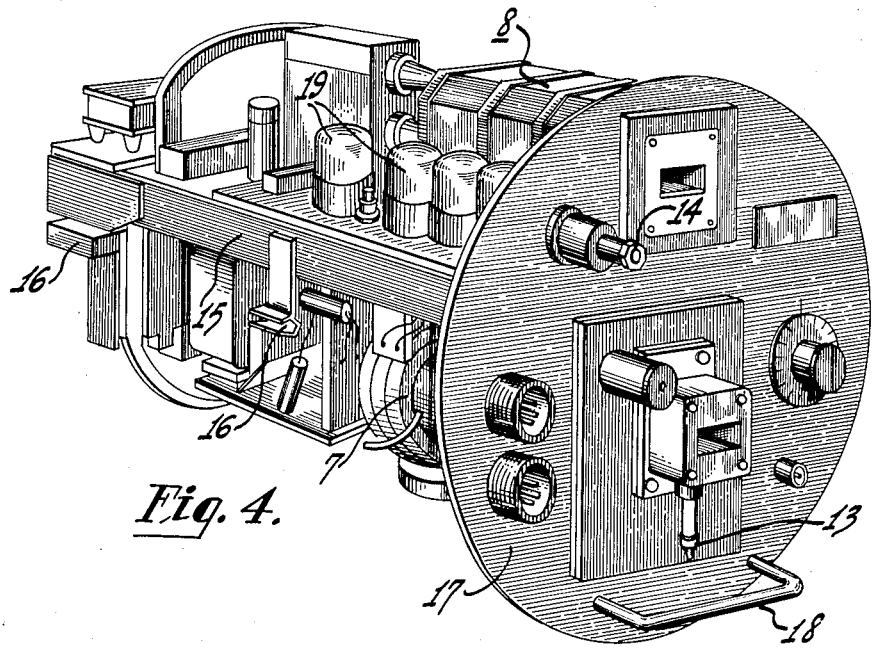
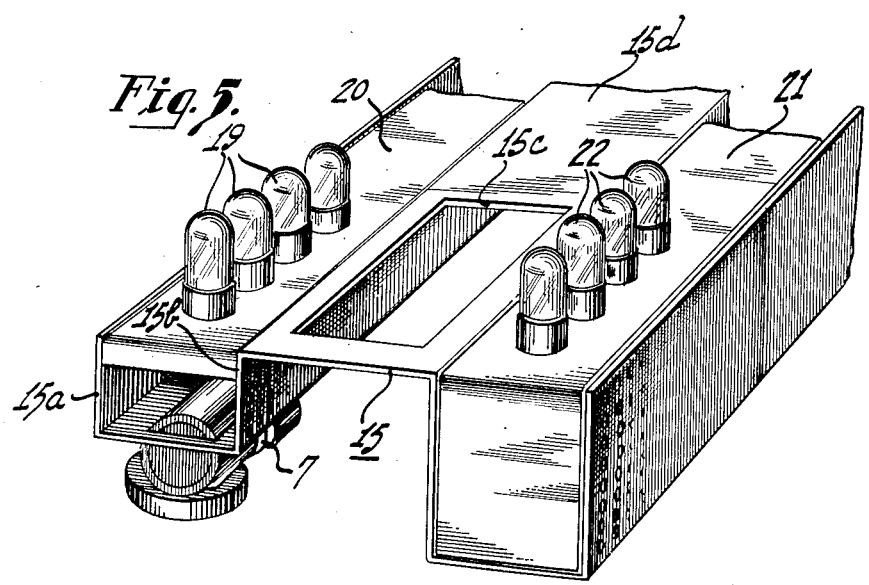
INVENTORS
Waldon P. Bollinger
Fredrick A. Fuhrmeister
& Justin E. Hill Jr.
BY C. D. Luska
        ATTORNEY Patented Dec. 18, 1951

2,579,249

UNITED STATES PATENT OFFICE 2,579,249

PRESSURIZED RADIO SYSTEM

Waldon P. Bollinger, Haddon Heights, N. J., Frederick A. Fuhrmeister, Havertown, Pa., and Justin E. Hill, Jr., Moorestown, N. J., assignors to Radio Corporation of America, a corporation of Delaware Application April 30, 1946, Serial No. 665,964

3 Claims. (Cl. 250—13)

This invention relates to pressurized radio equipment and will be described as applied to the pressurization of an ultra-high frequency radar system for use in aircraft and other mobile installations.

Radio systems, and especially systems designed to operate at ultra high frequencies, when electrically aligned at sea-level may exhibit undesired operating characteristics at high altitudes. Thus, a sub-atmospheric ambient may give rise to corona discharge, or to an arc-over between adjacent parts of the set. Similarly, the presence of moisture may alter the characteristic impedance of the unit and even cause a short-circuit therein. Efforts to obviate these difficulties as by enclosing individual parts of the installation complicate its inspection and repair and are otherwise unsatisfactory.

Accordingly, the principal object of the present invention is to obviate the foregoing and other less apparent objections to present day radio installations and to provide an improved installation wherein all of the parts including the antenna are incorporated in a single pressurized system.

Another and related object of the invention is to provide a chassis construction which lends itself readily for use in such a pressurized system.

Figure 1:
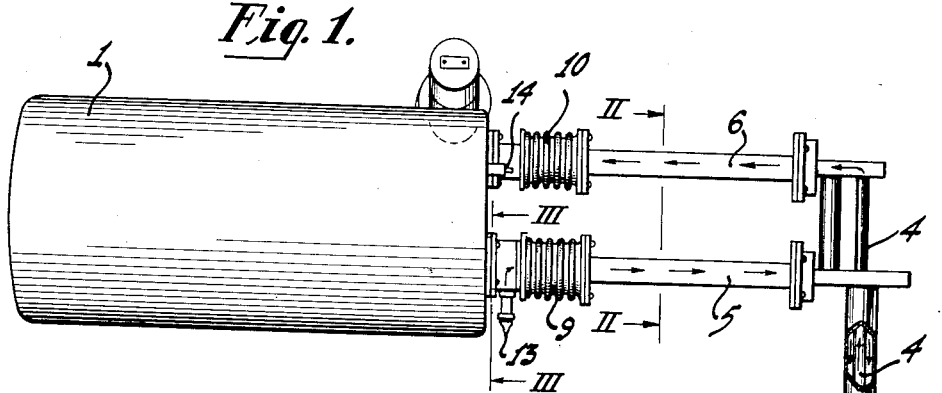
Figure 2:
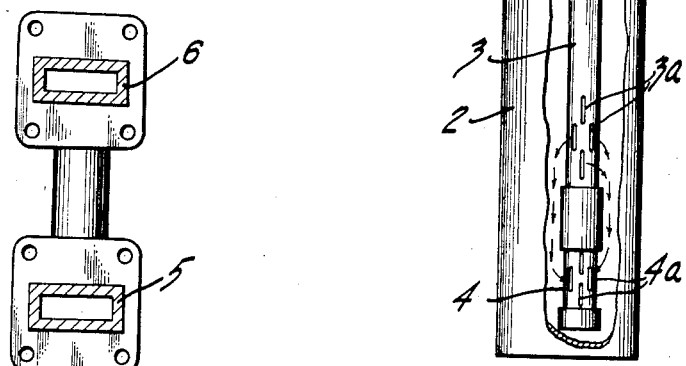
Figure 3:
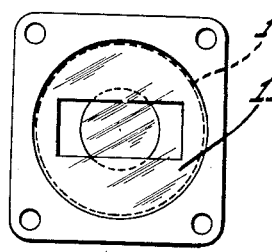

The invention will be described in connection with the accompanying drawings wherein:

Fig. 1 is a side elevational view, partly broken away, of a pressurized radar transceiver installation incorporating the invention; Figs. 2 and 3 are sectional views taken on the lines II—II and III—III, respectively, of Fig. 1; Fig. 4 is a view in perspective, with the pressurized casing removed, of the transceiving apparatus of the system of Fig. 1; and Fig. 5 is a view in perspective with many of the parts removed, of the chassis of the apparatus of Fig. 4.

The present invention may be applied to amplitude or frequency modulated systems of any type (i. e. telephony, radar etc.) wherein the frequency or frequencies of the signal-bearing waves dictate the use of a hollow transmission line, such as a wave guide or a coaxial cable, for making the necessary electrical connection between the antenna and the signal generating or receiving apparatus. The embodiment of the invention which has been selected for purposes of illustration comprises an amplitude modulated radar beacon system for use in aircraft and, as shown in Fig. 1, includes a gas-tight casing 1 for the "transceiver" (i. e. signal generating and receiving equipment), a second, streamlined, gas-tight casing or "radome" 2 for the transmitting and receiving antennas 3 and 4, respectively, and two hollow transmission lines or wave guides 5 and 6. One of the wave guides, i. e. the one designated 5 is electrically connected at one end, within the casing 1 to a magnetron or other signal generator 7 (Fig. 4) and, at its opposite end, to the transmitting antenna 3. The other wave guide 6 is connected at one end to the exposed end of the receiving antenna 4 and extends into the casing 1 where it is electrically connected to a crystal detector 8 (Fig. 4). The transmitting and receiving antennas 3 and 4 are of the slotted type and are concentrically mounted within the radome 2. In order to impart at least a limited degree of flexibility to the installation, flexible pipes or bellows 9 and 10 are preferably employed in connecting the wave guides (which in this case are inflexible) to the transceiver casing 1.

One of the wave guides, in this case the one (5) which connects the signal generator (7, Fig. 4) to the transmitting antenna 3 contains a glass or other "window" 11 in a metal frame 12 which is transparent to electrical waves but constitutes a barrier to the passage of a gaseous medium, such as dry air, which is employed in pressurizing the system and flushing it of moisture. An inlet valve 13 in the hollow guide 5 on the antenna side of the casing 1 constitutes means for introducing the gaseous medium under pressure into the system. A conventional bicycle pump, not shown, may be employed for this purpose. A pressure sensitive relief valve 14 on the front of the casing 1 and which communicates with the interior of said casing provides a normally closed outlet for removing moisture and excess gas from the system. It will now be apparent that when a dry gas is employed for flushing moisture from the casings 1 and 2 the path of the gas is from the inlet valve 13 through the wave guide 5 to the transmitting antenna 3 from whence it flows out of the slots 3a and into the slots 4a in the receiving antenna 4, then through the wave guide 6 to the casing 1 from whence the excess gas and moisture passes out through the relief valve 14.

The signal generating and translating apparatus (exemplified by the parts 7 and 8) are mounted within the casing 1 preferably on a chassis 15 of the crenelated construction shown in Figs. 4 and 5. The chassis is provided with shoes or runners 16 which will be understood to ride on suitable tracks (not shown) on the inside of the casing 1, and with a front panel 17 having a handle 18 to facilitate the removal of this "drawer" from its casing or housing. The crenelated or corrugated form of the chassis not only lends strength to the drawer but permits the transmitting and receiving apparatus to be divided into several discrete sub-assemblies which may be separately removed for purposes of inspection and repair. Thus, the vacuum tubes 19 which are associated with the signal generator 7 may be mounted adjacent to the said generator upon a removable panel 20 which is dimensioned to fit within the crenel between the upstanding side walls 15a and 15b of the chassis. Similarly the opposite side of the chassis may be allotted to another panel 21 containing the receiving tubes 22. In the instant case the crystal holders 8 fit within an opening 15c in the central horizontal portion 15d of the chassis. When prong-and-socket connectors are employed for connecting the several electrical units in circuit, the prong elements may be mounted, say, on the removable panels 20 and 21 and the sockets on the chassis 15, in which case it is not always necessary to employ bolts or screws for maintaining the panels in position.

It will now be apparent that the present invention provides an improved radio installation wherein all of the parts including the antenna are incorporated in a single moisture free, pressurized system.

What is claimed is:

1. In ultra high frequency radio apparatus the operating characteristics of which may be adversely affected by the presence of moisture and/or a sub-atmospheric ambient, said apparatus including a signal generator and an antenna, separate gas-tight casings in which said signal generator and said antenna are respectively mounted, a plurality of hollow transmission lines electrically connected to said generator and said antenna and communicating with the interior of said casings in gas tight relation therewith to provide a gas-tight system through which a gaseous medium may be circulated between said generator casing and said antenna casing for the purpose of freeing said radio apparatus of moisture, an inlet valve for introducing a gaseous medium under pressure into said system at one end of said path, and an outlet valve at the other end of said path for removing moisture and excess gas from said system.

2. In ultra-high frequency radio apparatus the operating characteristics of which may be adversely affected by the presence of moisture and/or an ambient of sub-atmospheric pressure, said apparatus comprising two spaced apart gas-tight casings, one of said casings containing a chassis of crenelated construction and a signal generator mounted upon said chassis, and the other of said casings containing a slotted hollow antenna, a pair of wave-guides electrically connected to said generator and to said antenna for the transmission of signals therebetween, the interior of said wave guides being hollow and communicating with the interior of said generator and antenna casings to form a gas-tight system through which a gaseous medium may be circulated in a predetermined path which includes said crenelated chassis and said slotted antenna for the purpose of pressurizing said apparatus and freeing the same from moisture, an inlet valve for introducing a gaseous medium under pressure into said system at one end of said path, and an outlet valve responsive to a predetermined pressure of said gas at the other end of said path within said system for removing moisture and excess gas from said radio apparatus.

3. The invention as set forth in claim 2 and wherein said radio apparatus comprises a radar transceiver.

WALDON P. BOLLINGER.
FREDERICK A. FUHRMEISTER.
JUSTIN E. HILL, JR.

REFERENCES CITED

The following references are of record in the file of this patent:

UNITED STATES PATENTS

| Number | Name | Date |
|---|---|---|
| 1,853,101 | Von Henke | Apr. 12, 1932 |
| 1,866,611 | Affel | July 12, 1932 |
| 2,115,787 | Runge | May 3, 1938 |
| 2,175,025 | Hooven | Oct. 3, 1939 |
| 2,376,725 | Richardson et al. | May 22, 1945 |
| 2,413,187 | McCurdy et al. | Dec. 24, 1946 |
| 2,416,177 | Hollingsworth | Feb. 18, 1947 |
| 2,417,052 | Benioff | Mar. 11, 1947 |
| 2,420,007 | Olden | May 6, 1947 |
| 2,509,231 | Hunter | May 30, 1950 |

FOREIGN PATENTS

| Number | Country | Date |
|---|---|---|
| 558,265 | Great Britain | Dec. 29, 1943 |